No. 624,993. Patented May 16, 1899.
H. O. SWOBODA.
ELECTRIC METER.
(Application filed Nov. 15, 1898.)
(No Model.)
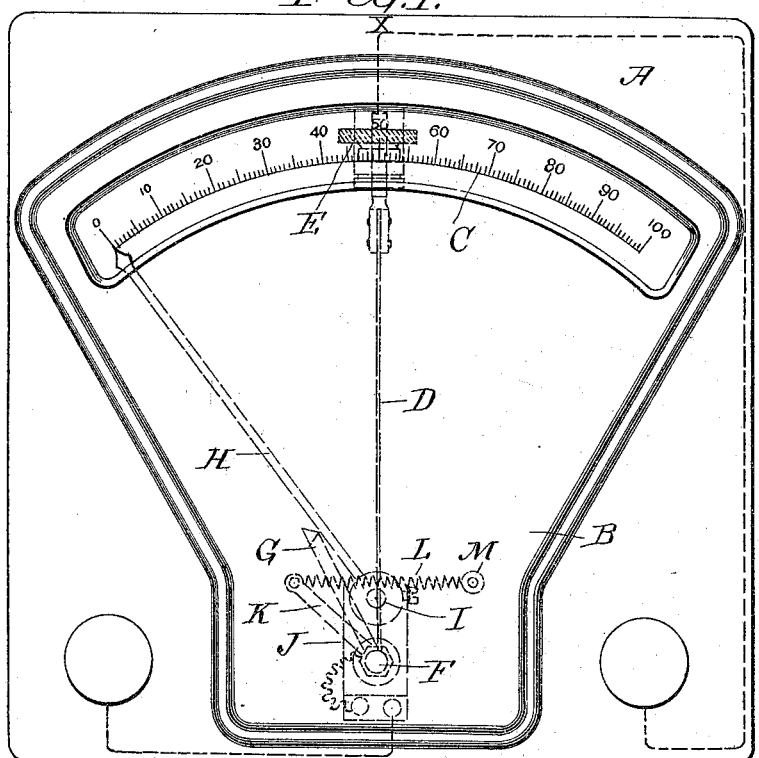
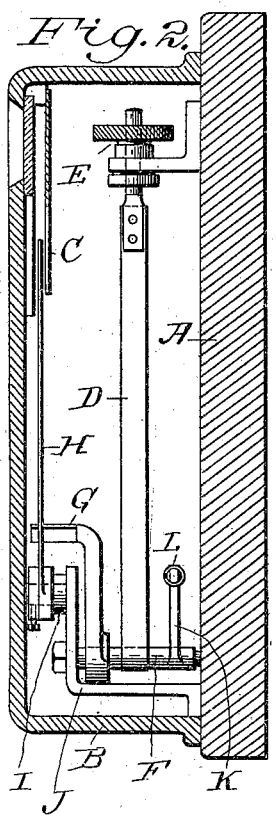
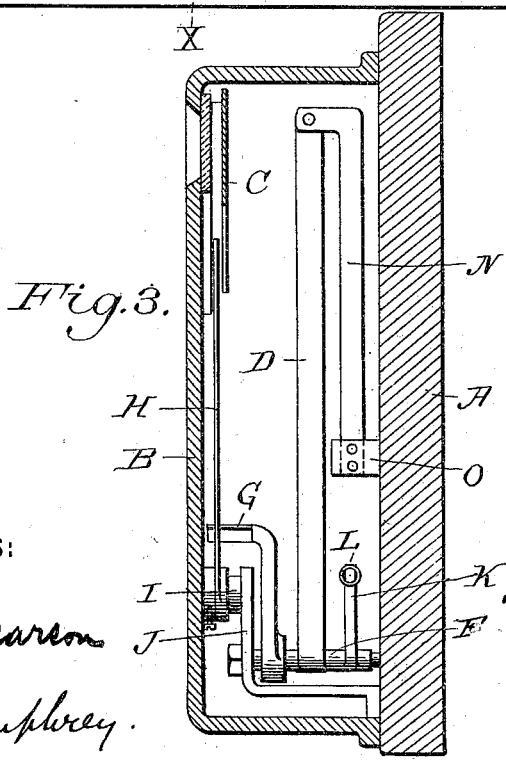
WITNESSES:
J. E. Pearson
W. H. Pumphrey.
INVENTOR
Hans Otto Swoboda
BY
Geo. H. Benjamin
ATTORNEY

UNITED STATES PATENT OFFICE.

HANS OTTO SWOBODA, OF NEW YORK, N. Y., ASSIGNOR TO THE GENERAL INCANDESCENT ARC LIGHT COMPANY, OF SAME PLACE.

ELECTRIC METER.

SPECIFICATION forming part of Letters Patent No. 624,993, dated May 16, 1899.

Application filed November 15, 1898. Serial No. 696,542. (No model.)

*To all whom it may concern:*

Be it known that I, HANS OTTO SWOBODA, a subject of the Emperor of Germany, residing at New York city, county and State of New York, have invented certain new and useful Improvements in Electric Meters, of which the following is a specification.

My invention relates to electric meters of the type which are known as "maximum-current" meters; and it consists, essentially, of a strip of metal having a known linear coefficient of expansion when traversed by an electric current, a lever actuated by a spring under tension, and a loosely-mounted index-needle arranged to be moved by the lever to such a position on a scale as will indicate the maximum electric current transmitted through the meter within any given period of time and to be left in such position when the lever moves backward or to its original position.

My invention further relates to the combination, with a meter mechanism consisting of the parts as set forth, of a device which will compensate for any change in linear dimensions of the strip traversed by the electric current and due to the variations in temperature of the locality in which the meter is situated.

In the accompanying drawings, which will serve to illustrate my invention, Figure 1 is a front view; Fig. 2, a vertical section taken on line X X of Fig. 1. Fig. 3 is a similar section and illustrates the meter provided with a compensating device.

In the drawings, A represents the base of the case; B, body of the case, and which is usually formed of metal; C, scale, which may be divided in any suitable manner. The scale is usually made of transparent material. D is an expansion-strip. This strip may be of any metal having a known coefficient of expansion when influenced by the passage through it of electric current. For practical purposes I prefer to make this strip of a composite material known in the arts as "platinoid." The strip is connected at one end to an adjusting-screw E and at the other end to a horizontally-mounted shaft F. Also mounted on the shaft is a lever G, which in its normal position lies to the left and in front of the index-needle H, which latter is loosely mounted upon the shaft I, supported in the bracket J. Also mounted upon the shaft F is an arm K, to which is connected the helical spring L, connected at its opposite end to the body of the case at M.

When no current is traversing the meter, the index-needle H is at zero to the left of the scale, and the strip D is under tension from the spring L. When a current is transmitted through the meter, the strip D expands in proportion to the current transmitted, thus permitting the tension exerted by the spring L to move the lever-arm G to the right and with it the index-needle H. The degree of movement of the index-needle H will of course depend upon the current traversing the strip D. When the current is cut off or decreases, the strip D contracts and exerts tension upon the shaft F, thereby gradually returning the lever-arm G to its original position, but leaving the index-needle H at the point to which it has been moved.

In Fig. 3, N indicates a compensating device, which consists of a strip of metal of determined length supported at one end by the bracket O. This strip may be made of any metal so long as its coefficient of expansion corresponds to that of the strip D, or, in other words, that it shall have such a degree of expansion as will permit the strip D to exert the same degree of tension upon the shaft F and against the action of the spring L and irrespective of the temperature of the locality in which the instrument is placed.

I am aware that electric meters have been made in which an index-pointer has been moved by the expansion and contraction of a metallic strip; but in such meters the index-finger has been moved in both directions, and therefore the device only served to indicate the current at the moment, whereas in the present device the index-needle always indicates the maximum current transmitted within a given period. Manifestly the mechanism introduced between the expansible strip and the pointer can be changed from that shown and described without materially affecting the intent of my invention.

Having thus described my invention, I claim—

1. In an electric meter, the combination of an expansible strip, a loosely-mounted index-needle, and means interposed between the two, actuated by the expansion of said strip which will move the needle to such a point, as will indicate the maximum electric current which has traversed the strip within a given time.

2. In an electric meter, the combination of an expansible strip, a shaft with which said expansible strip is connected, a lever mounted on said shaft, a device acting to rotate such shaft, and a loosely-mounted index-needle.

3. In an electric meter, the combination of an expansible strip, a temperature-compensating device connected to said strip, a loosely-mounted pointer, and means interposed between the two, actuated by the expansion of said strip which will move the needle to such a point, as will indicate the maximum electric current which has traversed the strip within a given time.

4. In an electric meter, the combination of an expansible strip, a shaft, and a device tending to rotate such shaft, a lever on said shaft, and a loosely-mounted index-needle.

In testimony whereof I affix my signature in the presence of two witnesses.

HANS OTTO SWOBODA.

Witnesses:
P. H. KLEIN, Jr.,
JAMES J. SLATOR.